United States Patent
Tanabe

(10) Patent No.: US 6,829,494 B2
(45) Date of Patent: Dec. 7, 2004

(54) RADIO COMMUNICATION TERMINAL AND CONTROL METHOD THEREFOR

(75) Inventor: Masayoshi Tanabe, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 560 days.

(21) Appl. No.: 09/746,770

(22) Filed: Dec. 26, 2000

(65) Prior Publication Data

US 2001/0006390 A1 Jul. 5, 2001

(30) Foreign Application Priority Data

Dec. 27, 1999 (JP) ............................................. 11-370381

(51) Int. Cl.$^7$ ............................ H04M 1/00; H04B 1/16; G09G 3/36; G09G 1/14
(52) U.S. Cl. ................. 455/574; 455/127.4; 455/127.5; 455/343.1; 455/343.3; 345/102; 345/20; 345/12
(58) Field of Search ............................... 455/574, 127.1, 455/127.4, 127.5, 127.6, 127.7, 343.1–343.6, 566, 90.1, 90.2, 572, 573, 230, 231; 345/102, 12, 20, 10, 29, 214, 204, 211, 212; 379/433.04

(56) References Cited

U.S. PATENT DOCUMENTS

| | | | | |
|---|---|---|---|---|
| 5,212,810 A | * | 5/1993 | Maeda et al. ............... | 455/528 |
| 5,548,832 A | * | 8/1996 | Karam ..................... | 455/226.4 |
| 6,219,021 B1 | | 4/2001 | Izumi ......................... | 345/102 |
| 6,246,888 B1 | * | 6/2001 | Tsuchiyama ................. | 455/566 |
| 6,278,887 B1 | * | 8/2001 | Son et al. .................... | 455/566 |
| 6,373,397 B1 | * | 4/2002 | Song ........................ | 340/815.4 |
| 6,463,305 B1 | * | 10/2002 | Crane .......................... | 455/566 |
| 6,625,478 B1 | * | 9/2003 | Nonogaki .................... | 455/574 |

FOREIGN PATENT DOCUMENTS

| | | | | |
|---|---|---|---|---|
| JP | 11-102173 | | 4/1999 | |
| WO | WO 97/03432 | * | 1/1997 | ............ G09G/3/36 |

* cited by examiner

*Primary Examiner*—Duc M. Nguyen
(74) *Attorney, Agent, or Firm*—Finnegan, Henderson, Farabow, Garrett & Dunner, L.L.P.

(57) ABSTRACT

In a radio communication terminal, a microprocessor determines a mode selected by user manipulation of a key input portion. The microprocessor turns on a backlight of a display with the backlight in accordance with the determined mode, controls the time period of a bright display mode, and turns the backlight off after the lapse of the period to switch the bright display mode to a dark display mode. The ON time period in the bright display mode is set longer in another mode than in a normal mode. The backlight ON time is optimally controlled in correspondence with a mode selected by the user, thereby improving the operability and prolonging the service life of the battery.

27 Claims, 4 Drawing Sheets

RADIO COMMUNICATION TERMINAL AND CONTROL METHOD THEREFOR

CROSS-REFERENCE TO RELATED APPLICATIONS

This application is based upon and claims the benefit of priority from the prior Japanese Patent Application No. 11-370381, filed Dec. 27, 1999, the entire contents of which are incorporated herein by reference.

BACKGROUND OF THE INVENTION

The present invention relates to a radio communication terminal having a display such as an LCD (Liquid Crystal Display) with a backlight and a control method therefor and, more particularly, to a radio communication terminal whose operability is improved by optimally controlling the backlight ON time in correspondence with a mode selected by the user, and a control method therefor.

In general, a radio communication terminal such as a mobile phone or cellular phone comprises a display for displaying various pieces of information to the user. As the display, an LCD with a backlight is used to meet demands for downsizing a radio communication terminal of this type and cope with various use environments.

To prevent consumption of the battery, the LCD with a backlight is controlled to keep the backlight on for a predetermined period, e.g., 10 sec after user manipulation, e.g., when the user presses any key, and automatically turn the backlight off when no new user manipulation is done within the predetermined period.

Recent radio communication terminals such as mobile phones or cellular phones have remarkably been developed to realize various functions.

These functions include a service of accessing a remote server which stores data, and extracting desired contents stored in the storage server, like WAP (Wireless Application Protocol) service. When the user is to receive this service and enters this service mode, key manipulation or the like may become unnecessary for a predetermined time.

Also in a mail creation mode or mail browsing mode for mail communication frequently used recently, user manipulation such as press of a key may not be done for a predetermined time.

However, in a radio communication terminal having a conventional LCD with a backlight, the backlight is turned off if no new user manipulation is done within a predetermined period after user manipulation, as described above. When the user selects the information extraction mode such as the WAP service, mail creation mode, mail browsing mode, or the like, the backlight is often automatically turned off against the user's will. In this case, the user must perform redundant manipulation of, e.g., manipulating any key in order to turn the backlight on again.

If the user erroneously manipulates the key, the mode selected by the user may be switched to another unintentional mode, or the user may perform erroneous character input.

To solve this problem, the backlight ON time of the LCD with a backlight may be prolonged. However, simply prolonging the backlight ON time fails to achieve the original purpose of preventing consumption of the battery.

BRIEF SUMMARY OF THE INVENTION

It is an object of the present invention to provide a radio communication terminal for optimally controlling the backlight ON time in accordance with a function selected by the user, thereby improving the operability and prolonging the service life of a battery, and a control method therefor.

According to the present invention, there is provided a radio communication terminal having display means for displaying information to a user, and
backlight means for illuminating the display means with a light beam in correspondence with user manipulation, thereby improving visibility, comprising
determination means for determining a function selected by the user, and
control means for changing an ON time of the backlight means after the user manipulation in correspondence with the function determined by the determination means.

Consistent with an aspect of the present invention, when new user manipulation is done within the ON time, the backlight means updates the ON time.

Consistent with an aspect of the present invention, when an information reception mode via a radio channel is selected, the control means prolongs the ON time.

Consistent with an aspect of the present invention, when a mail creation mode is selected, the control means prolongs the ON time.

Consistent with an aspect of the present invention, when a mail browsing mode is selected, the control means prolongs the ON time.

The present invention may provide control method for a radio communication terminal having display means for displaying information to a user, and backlight means for illumination the display means with a light beam in correspondence with user manipulation, thereby improving visibility, comprising determining a function selected by the user, and changing an ON time of the backlight means after the user manipulation in correspondence with the determined function.

Consistent with an aspect of the present invention, when new user manipulation is done within the ON time of the backlight means, the ON time is updated.

Consistent with another aspect of the present invention, when any one of an information reception mode via a radio channel, mail creation ode, and mail browsing mode is selected, the ON time is prolonged in correspondence with the selected mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of a radio communication terminal and a control method therefor according to the present invention will be described in detail below with reference to the several views of the accompanying drawing.

Figure 1:
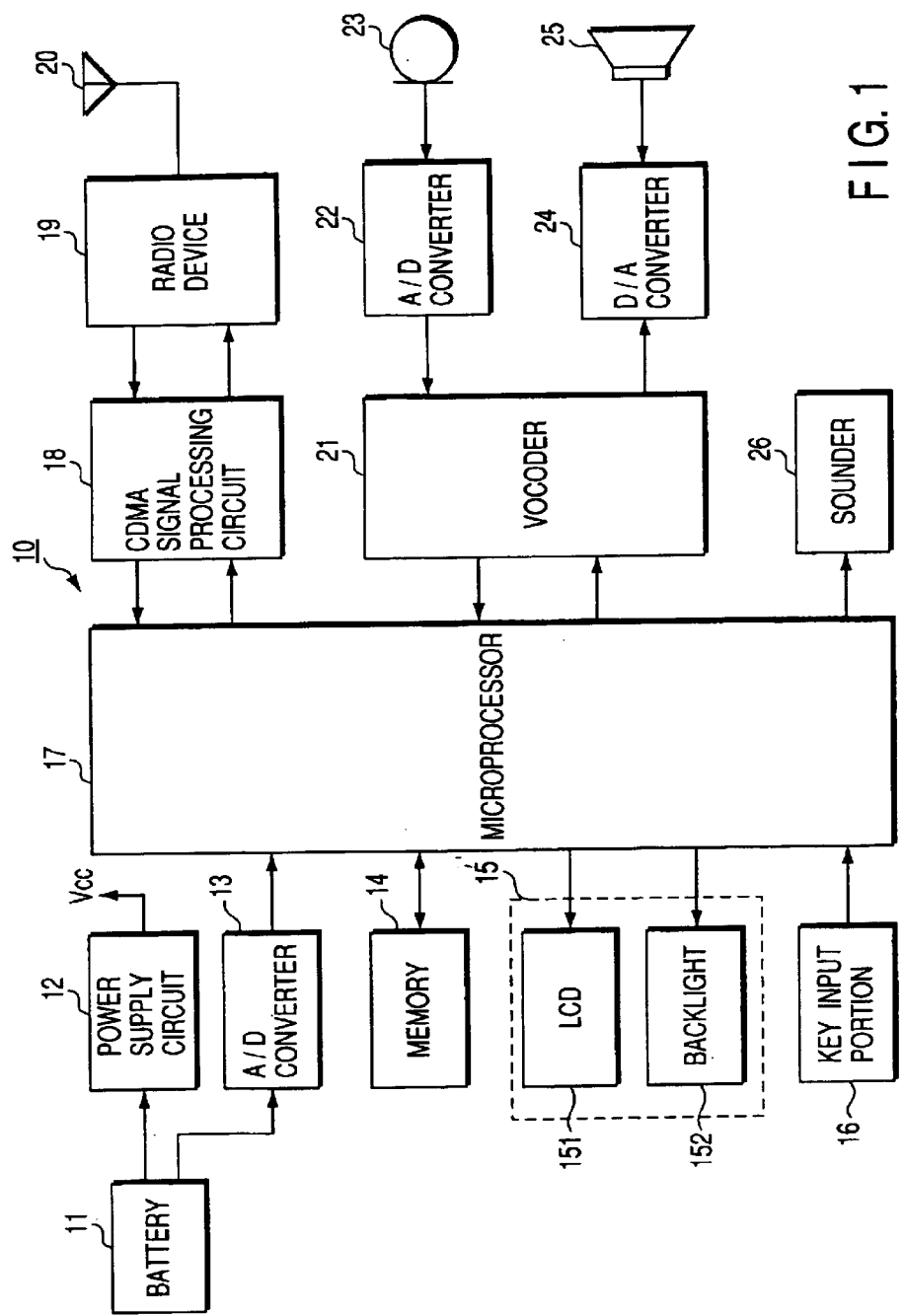
FIG. 1 is a block diagram schematically showing the circuit arrangement of a mobile phone or cellular phone as a radio communication terminal according to an embodiment of the present invention.

FIG. 1 is a block diagram showing an embodiment of a mobile phone or cellular phone to which a radio communication terminal and a control method therefor according to the present invention are applied.

In FIG. 1, a mobile or cellular phone 10 of this embodiment adopts a CDMA (Code Division Multiple Access) method. The mobile or cellular phone 10 comprises a battery 11 serving as a power supply, a power supply circuit 12, an A/D converter 13, a memory 14, a display 15 with a backlight, a key input portion 16, a microprocessor 17, a processing circuit 18 for processing a CDMA signal, a radio device 19, an antenna 20, a vocoder 21, an A/D converter 22, a microphone 23, a D/A converter 24, a loudspeaker 25, and a sounder 26.

The battery 11 is formed from a chargeable secondary battery. An output from the battery 11 is supplied to the power supply circuit 12, which supplies a power supply voltage Vcc to each portion of the mobile or cellular phone 10. In addition, an output from the battery 11 is A/D-converted by the A/D converter 13, and supplied to the microprocessor 17.

The memory 14 stores various pieces of information of the mobile or cellular phone 10, control programs for the microprocessor 17, and the like. The display 15 is made up of an LCD (Liquid Crystal Display) 151, and a backlight 152 for improving the visibility of the LCD 151. As will be described later, ON operation of the backlight 152 is controlled. The LCD 151 displays information in a dark display mode when the backlight 152 is not turned on, and displays information in a bright display mode when the backlight is turned on. In the dark display mode, a light beam outside the LCD 151 is reflected by the LCD 151, and the user recognizes a dark image. In the bright display mode, the LCD 151 is illuminated by a light beam mainly from the backlight, and an image is displayed bright. The key input portion 16 has a plurality of keys containing a dial key. User manipulation to the mobile or cellular phone 10 is done via the key input portion 16.

The microprocessor 17 integrally controls the whole operation of the mobile or cellular phone 10. ON control of the backlight 152, which is a characteristic feature of the embodiment, is also executed under the control of the microprocessor 17.

The CDMA (Code Division Multiple Access) signal processing circuit 18 processes a CDMA signal when the mobile or cellular phone 10 communicates by radio with a public base station (not shown). A transmission signal from the microprocessor 17 is converted into a CDMA signal by the CDMA signal processing circuit 18, and the CDMA signal is transmitted to the public base station via the radio device 19 and antenna 20. A reception signal from the public base station is received as a CDMA signal via the antenna 20 and radio device 19, and converted into a digital audio signal by the CDMA signal processing circuit 18. The digital audio signal is input to the microprocessor 17.

The microphone 23 and loudspeaker 25 constitute the handset of the mobile or cellular phone 10. Voice input from the microphone 23 is A/D-converted by the A/D converter, the converted digital signal is encoded by the vocoder or voice coder 21, and the encoded digital signal is input to the microprocessor 17. The encoded digital signal from the microprocessor 17 is input to the CDMA signal processing circuit 18 where the digital signal is converted into a CDMA signal. The CDMA signal is transmitted as a radio signal to the public base station via the radio device 19 and antenna 20.

An audio signal received via the antenna 20 and radio device 19 is input to the CDMA signal processing circuit 18 where the CDMA signal is converted into an encoded digital audio signal. The encoded digital audio signal is input to the microprocessor 17. The encoded digital audio signal from the microprocessor 17 is decoded into an audio digital signal by the vocoder 21, and the audio digital signal is converted into an analog signal by the D/A converter 24. The analog signal is supplied to the loudspeaker 25, which outputs it as voice.

The sounder 26 outputs a ringing tone in order to inform the user of termination in terminating operation of the mobile or cellular phone 10.

The mobile or cellular phone 10 according to the embodiment of the present invention shown in FIG. 1 can realize various functions by selecting speech modes in which speech is made using the mobile or cellular phone 10, i.e., (1) a WAP service mode, (2) a mail creation mode, (3) a mail browsing mode, or the like by user manipulation via the key input portion 16 in addition to a normal mode. The ON time of the backlight 152 of the display 15 is optimally controlled in accordance with a function, i.e., mode selected by user manipulation. This improves the operability of the mobile or cellular phone 10 and minimizes consumption of the battery 11.

More specifically, in the mobile or cellular phone 10 according to the embodiment of the present invention, a function selected by user manipulation of the key input portion 16 is determined by the microprocessor 17, which variably controls the ON time of the backlight 152 of the backlight-attached display 15 in correspondence with the determined function, as will be described later. That is, the microprocessor 17 sets in accordance with user manipulation a period during which the display 15 displays information in a bright mode, and after the time period elapses, controls the display 15 to display information in a dark display mode in order to minimize consumption of the battery 11.

Figure 2:
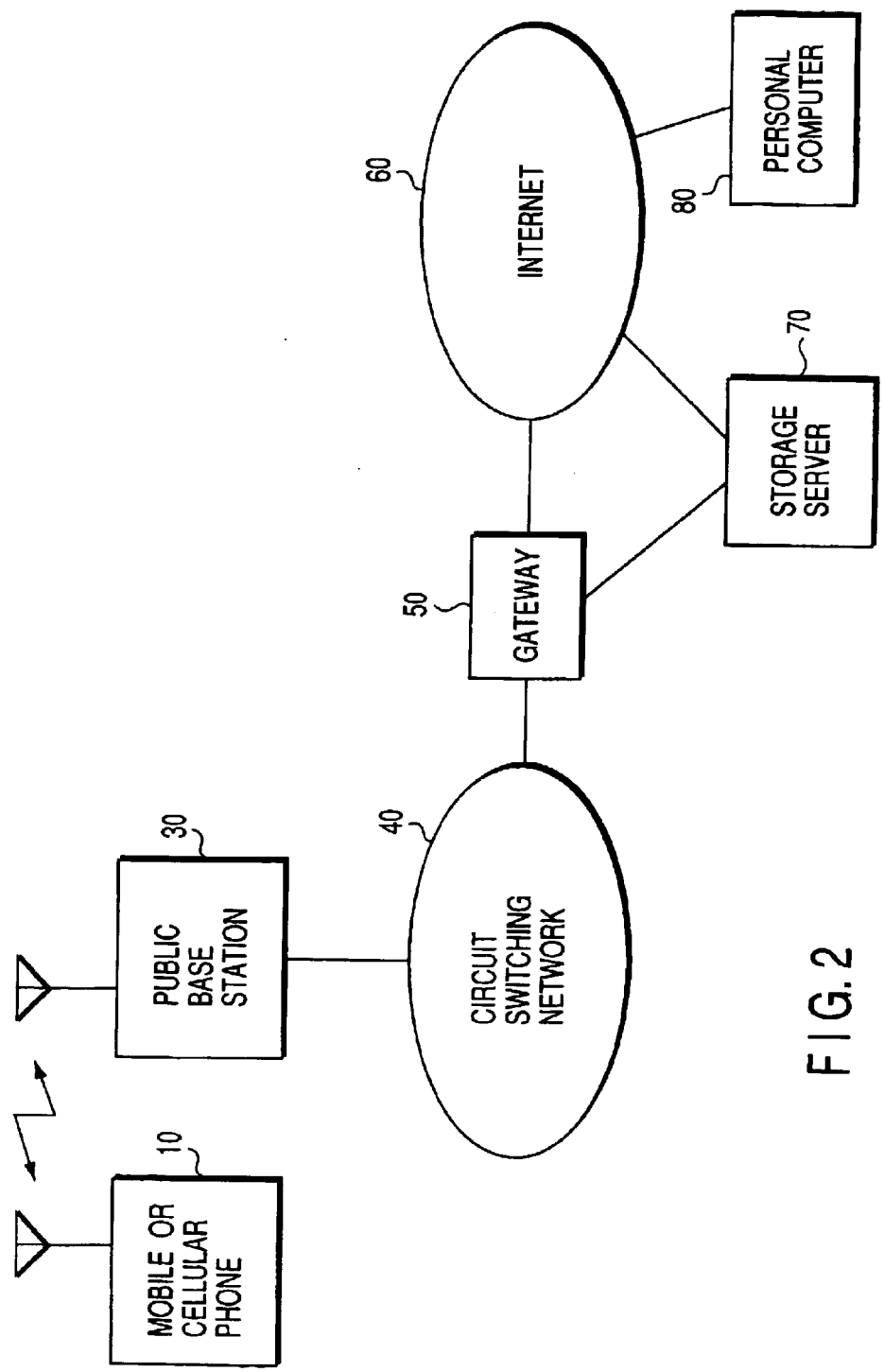
FIG. 2 is a block diagram showing a whole system for explaining the WAP (Wireless Application Protocol) service realized by the mobile phone shown in FIG. 1.

FIG. 2 is a block diagram showing a whole system for explaining the WAP service realized using the mobile or cellular phone 10 shown in FIG. 1.

The mobile or cellular phone 10 shown in FIG. 1 is connected by radio to a public base station 30 distributed to each location. A speech function of making speech using the mobile or cellular phone 10, and various communication functions other than the speech function can be realized.

The public base station 30 is connected to a circuit switching network 40 having a packet switching function. The circuit switching network 40 is connected via a gateway 50 to the Internet 60 and a storage server 70 for realizing the WAP service. The storage server 70 is connected to the Internet 60, which is connected to a personal computer 80.

In the WAP service realized using the mobile or cellular phone 10, the mobile or cellular phone 10 accesses the storage server 70 via the public base station 30, circuit switching network 40, and gateway 50. Desired information is extracted from information stored in the storage server 70, and supplied to the mobile or cellular phone 10. The information is displayed on the display 15 of the mobile or cellular phone 10, thereby realizing the WAP service.

On the display 15 of the mobile or cellular phone 10 shown in FIG. 1, the backlight 152 is generally kept off, and the display 15 is driven in a dark display mode in order to prevent consumption of the battery 11. Only when any key of the key input portion 16 is pressed to supply a user input, the backlight 152 of the backlight-attached display 15 is turned on to drive the display 15 in a bright display mode. If no new user manipulation of pressing any key of the key input portion 16 is done within a predetermined period, e.g., 10 sec in this bright display mode, the backlight 152 is automatically turned off to return the display 15 to the dark display mode. The backlight-attached display 15 is controlled by the microprocessor 17 so as to switch the display 15 from the bright display mode to the dark display mode.

However, when the user is to receive the WAP (Wireless Application Protocol) service as described with reference to FIG. 2, a situation in which no key manipulation is done within the predetermined time period during which the display 15 is maintained in the bright mode occurs at a high probability in consideration of a period required to establish communication between the mobile or cellular phone 10 and the storage server 70, and a subsequent communication time.

In this case, the backlight 152 of the display 15 is automatically turned off to switch the display 15 to the dark display mode. To confirm information displayed on the display 15 on the basis of the WAP service in, e.g., a dark place, the user must manipulate any key of the key input portion 16 in order to turn the backlight 152 on again and set the bright display mode again.

At this time, if a key which does not influence the WAP service exists, the user can press this key to turn the backlight 152 on again, thereby setting the bright display mode without influencing the WAP service. If, however, the user erroneously presses a key which influences the WAP service, the display 15 may switch to another mode not intended by the user only to execute erroneous character input.

In addition, redundant key manipulation is done every time the backlight 152 must be turned on again, i.e., the display 15 is displayed in the bright display mode. This is cumbersome and undesirable in terms of user operability.

To solve this, when the WAP service mode is selected in the mobile or cellular phone 10 of this embodiment, the time period during which the backlight 152 of the backlight-attached display 15 is turned on to maintain the bright display mode (corresponding to an automatic OFF period after which the backlight 152 is automatically turned off if no user manipulation is done within this time period) is prolonged under the control of the microprocessor 17.

Figure 3:
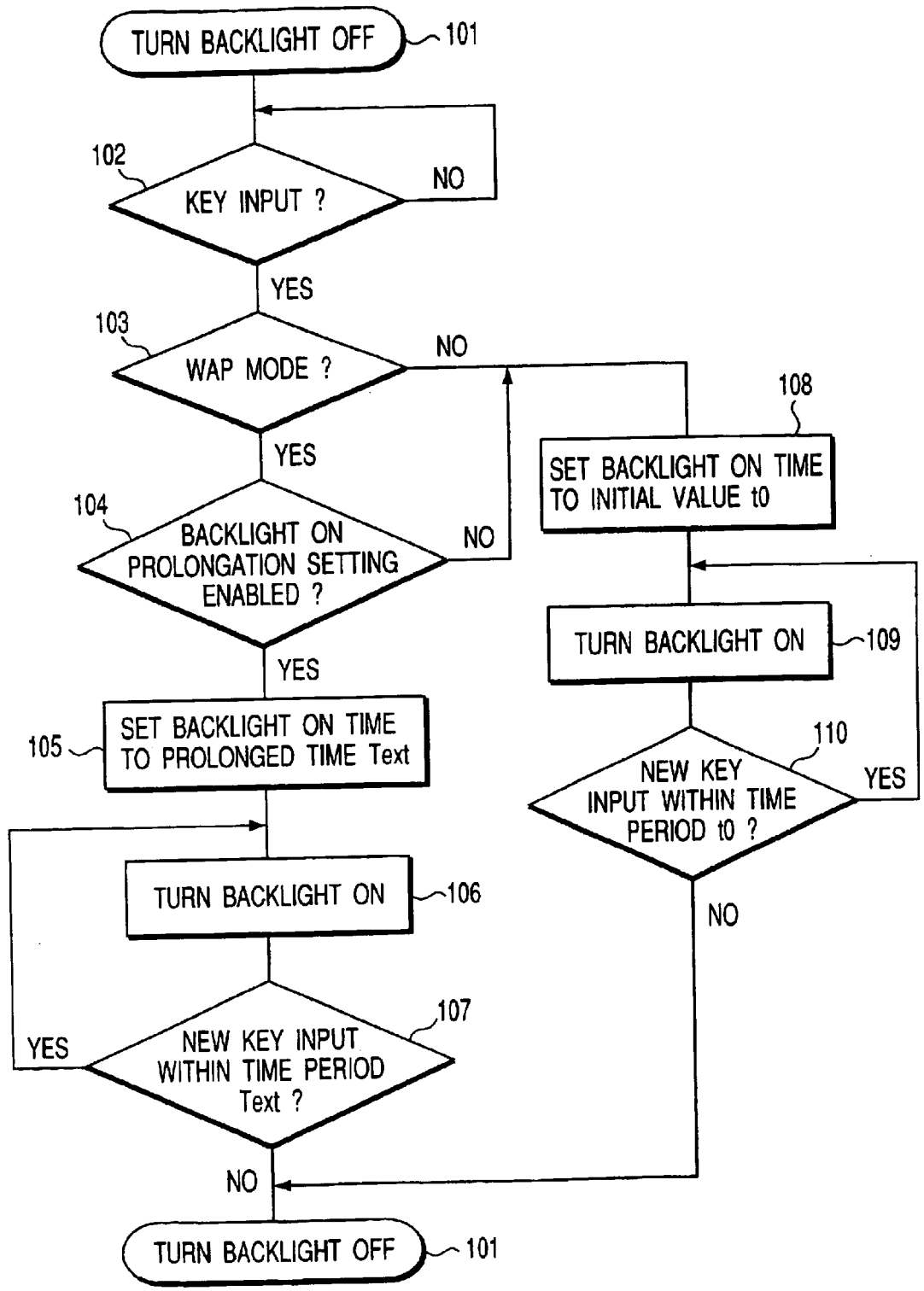
FIG. 3 is a flow chart showing processing of controlling ON operation of the backlight of a display with a backlight in the microprocessor of the mobile phone shown in FIG. 1.

FIG. 3 is a flow chart showing processing of controlling ON operation of the backlight 152 of the backlight-attached display 15 in the microprocessor 17 of the mobile or cellular phone 10 shown in FIG. 1.

In FIG. 3, if the backlight 152 of the display 15 is in the OFF state (dark display mode) (step 101), the microprocessor 17 monitors a key input from the key input portion 16 (step 102). If no key input is supplied from the key input portion 16 (NO in step 102), the microprocessor 17 returns to step 102 to keep monitoring a key input from the key input portion 16. If any key of the key input portion 16 is pressed, and the microprocessor 17 determines that a key input is supplied (YES in step 102), the microprocessor 17 checks whether the WAP mode is selected (step 103).

If the microprocessor 17 determines that the WAP mode is not selected (NO in step 103), it controls ON operation of the backlight in a normal mode, i.e., conversation mode. If no input is supplied in the bright display mode, and the automatic OFF period elapses, the backlight is turned off to return the display 15 to the dark display mode.

More specifically, in a normal mode, the microprocessor 17 sets the time period during which the backlight 152 of the display 15 is kept on, to a predetermined initial value t0 (step 108), and turns the backlight 152 on to set the bright display mode (step 109). If any key of the key input portion 16 is pressed to supply a key input within the time period of the initial value t0 after the backlight 152 is turned on (YES in step 110), the microprocessor 17 returns to step 109, updates the time period during which the backlight 152 is kept on (period of the bright display mode), and keeps the backlight 152 on.

However, if no key of the key input portion 16 is pressed within the time period of the initial value t0, and the microprocessor 17 determines in step 110 that no new key input is supplied within the time period t0 (NO in step 110), the backlight 152 is automatically turned off, and the display 15 returns to the dark display mode (step 101) in which the backlight 152 of the display 15 is turned off.

To the contrary, if the microprocessor 17 determines in step 103 that the WAP mode is selected (YES in step 103), it prolongs the time period during which the backlight 152 of the display 15 is kept on, to a prolonged time period Text, and controls ON operation of the backlight on the basis of the prolonged time period Text.

Whether to prolong the time period during which the backlight 152 is kept on is realized by the user by setting in the mobile or cellular phone 10 ON time prolongation of the backlight 152 which selects to keep the backlight 152 on during at least the prolonged time period Text in manipulating the mobile or cellular phone 10 by the user and operating the mobile or cellular phone 10 in the WAP mode. That is, when the user sets ON time prolongation of the backlight by his manipulation in advance to the time period Text prolonged from the time period (period of the bright display mode) during which the backlight 152 is kept on, the function of prolonging the ON time period of the backlight 152 is executed. To the contrary, when the user disables in advance the backlight ON prolongation setting, the function of prolonging the ON time period of the backlight 152 is not executed, and ON operation of the backlight is controlled in a normal mode in which the backlight is turned off after the time period t0.

If the microprocessor 17 determines in step 103 that the WAP mode is selected (YES in step 103), it checks whether the backlight ON prolongation setting is enabled (step 104). If the microprocessor 17 determines that the backlight ON prolongation setting is disabled (NO in step 104), it shifts to step 108 to control ON operation of the backlight in the above-mentioned normal mode.

If the microprocessor 17 determines in step 104 that the backlight ON prolongation setting is enabled (YES in step 104), it sets the ON time of the backlight 152 of the display 15 to the prolonged time period Text (>t0) (step 105), and keeps the backlight 152 on (step 106).

If any key of the key input portion 16 is pressed to supply a key input within the prolonged time period Text after the backlight 152 is turned on (YES in step 107), the microprocessor 17 returns to step 106, updates the ON time of the backlight 152, and keeps the backlight 152 on.

If, however, no key of the key input portion 16 is pressed within the prolonged time period Text, and the microprocessor 17 determines in step 107 that no new key input is supplied within the prolonged time period Text (NO in step 107), the backlight 152 is automatically turned off, the backlight 152 of the display 15 changes to the OFF state, and the display 15 returns to the dark display mode (step 101).

According to the embodiment of the mobile or cellular phone in the present invention, when the WAP mode is selected, the ON time period of the backlight 152 of the display 15 is prolonged from the initial value t0 to the prolonged time period Text. If the prolonged time period Text is set to a time, e.g., 30 sec enough to receive the WAP service, a situation in which the backlight 152 of the display 15 is automatically turned off during the WAP service can be prevented as much as possible. As a result, user manipulation of performing redundant key operation in order to turn the backlight 152 on again can be eliminated to greatly improve the operability of the mobile or cellular phone.

In the above embodiment, the ON time period of the backlight 152 of the display 15 is prolonged from the initial value t0 to the prolonged time period Text when the WAP mode is selected. Also, the ON time period of the backlight 152 of the display 15 may be prolonged when another function which requires prolongation of the ON time period of the backlight is selected, and the mobile or cellular phone is manipulated in another mode.

Also, a situation in which no key manipulation of the key input portion 16 is done within a predetermined time period may occur in another mode, e.g., a mail creation mode in which mail is created in a mail communication function of sending/receiving e-mail, or a mail browsing mode in which mail is browsed. Also when the mail creation mode or mail browsing mode is selected, the ON time period of the backlight 152 of the display 15 is prolonged. In this case, the same effect of eliminating any redundant key manipulation of turning the backlight 152 on again can be expected.

Figure 4:
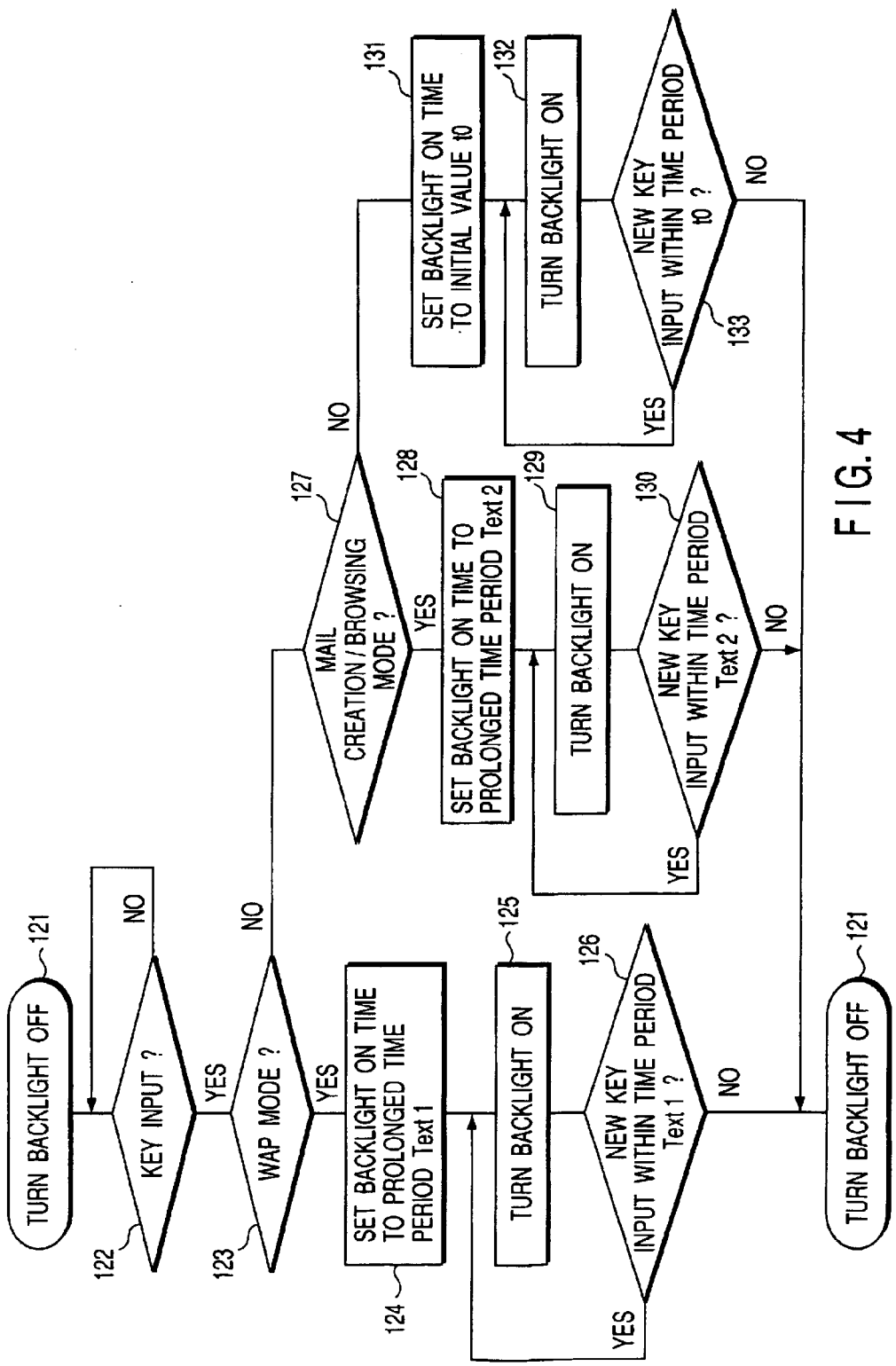
FIG. 4 is a flow chart showing another processing of controlling ON operation of the backlight of the display with a backlight in the microprocessor of the mobile phone shown in FIG. 1.

FIG. 4 is a flow chart showing another processing of controlling ON operation of the backlight 152 of the display 15 in the microprocessor 17 of the mobile or cellular phone 10 shown in FIG. 1.

In ON control processing of the backlight 152 of the display 15 shown in FIG. 4, the microprocessor 17 controls the backlight 152 so as to prolong the ON time period (period of the bright display mode) of the backlight 152 of the display 15 not only when the WAP mode is selected but also when the mail creation/browsing mode is selected.

In FIG. 4, if the backlight 152 of the display 15 is in the OFF state (step 121), the microprocessor 17 monitors a key input from the key input portion 16 (step 122). If no key input is supplied from the key input portion 16 (NO in step 122), the microprocessor 17 returns to step 122 to keep monitoring any key input from the key input portion 16. If any key of the key input portion 16 is pressed, and the microprocessor 17 determines that a key input is supplied (YES in step 122), the microprocessor 17 checks whether the WAP mode is selected (step 123).

If the microprocessor 17 determines that the WAP mode is selected (YES in step 123), it sets the ON time of the backlight 152 of the display 15 to a prolonged time period Text1 (>t0) (step 124). The backlight 152 is turned on to display information on the display 15 in the bright display mode (step 125). If any key of the key input portion 16 is pressed to supply a key input within the prolonged time period Text1 after the backlight 152 is turned on (YES in step 126), the microprocessor 17 returns to step 125, updates the ON time of the backlight 152, and keeps the backlight 152 on (bright display mode).

If, however, no key of the key input portion 16 is pressed within the prolonged time period Text1, and the microprocessor 17 determines in step 126 that no new key input is supplied within the prolonged time period Text1 (NO in step 126), the backlight 152 is automatically turned off, and the display 15 returns to the OFF state of the backlight 152 of the display 15, i.e., to the dark display mode (step 121).

If the microprocessor 17 determines in step 123 that no WAP mode is selected (NO in step 123), it checks whether the mail creation/browsing mode is selected (step 127).

If the microprocessor 17 determines that the mail creation/browsing mode is selected (YES in step 127), it sets the ON time of the backlight 152 of the display 15 to a prolonged time period Text2 (>t0) (step 128), and turns the backlight 152 on (step 129).

In this case, the prolonged time period Text2 is set to a value optimal for the manipulation status in consideration of the manipulation status upon selecting the mail creation/browsing mode. The prolonged time period Text2 may be set to the same value as the prolonged time period Text1 upon selecting the above-mentioned WAP mode.

If the microprocessor 17 turns on the backlight 152 of the display 15 in step 129, it checks whether any key of the key input portion 16 is pressed to supply a key input within the prolonged time period Text2 after the backlight 152 is turned on (step 130). If the microprocessor 17 determines that a new key input is supplied within the time period Text2 (YES in step 130), it returns to step 129, updates the ON time of the backlight 152, keeps the backlight 152 on, and maintains the bright display mode.

If no key of the key input portion 16 is pressed within the prolonged time period Text2, and the microprocessor 17 determines in step 130 that no new key input is supplied within the time period Text2 (NO in step 130), the backlight 152 is automatically turned off to return to the OFF state of the backlight 152 of the display 15, i.e., to the dark display mode (step 121).

If the microprocessor 17 determines in step 127 that the mail creation/browsing mode is not selected (NO in step 127), the microprocessor 17 controls ON operation of the backlight in a normal mode.

More specifically, the microprocessor 17 sets the ON time of the backlight 152 of the display 15 to the predetermined initial value t0 (step 131), and turns the backlight 152 on (step 132).

If any key of the key input portion 16 is pressed to supply a key input within the time period of the initial value t0 after the backlight 152 is turned on (YES in step 133), the microprocessor 17 returns to step 132, updates the ON time period of the backlight 152, keeps on the backlight 152, and maintains the bright display mode.

If no key of the key input portion 16 is pressed within the time period of the initial value t0, and the microprocessor 17 determines in step 133 that no new key input is supplied within the time period t0 (NO in step 133), the backlight 152 is automatically turned off, and the display 15 returns to the OFF state of the backlight 152 of the display 15, i.e., to the dark display mode (step 121).

Note that in this embodiment, the ON time of the backlight 152 of the backlight-attached display 15 is automatically prolonged to the time period Text1 when the WAP mode is selected, and to the time period Text2 when the mail creation/browsing mode is selected. Alternatively, whether to enable/disable the backlight ON prolongation setting may be set in advance in ON control processing shown in FIG. 3 individually for the WAP mode and mail creation/browsing mode, and only when the backlight ON prolongation setting is enabled, the ON time of the backlight 152 of the display 15 may be prolonged to the prolonged time T01 or T02.

As has been described above, according to the present invention, in a control method for a radio communication terminal having a display means for displaying information to the user and a backlight means which is turned on for a predetermined time in accordance with user manipulation to improve the visibility of the display means, a function selected by the user is determined, and the ON time of the backlight means after the user manipulation is changed in correspondence with the determined function. This produces the effects of realizing optimal backlight ON control in correspondence with a function selected by the user, greatly improving the operability of the radio communication terminal, and reducing consumption of the battery as much as possible.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication terminal comprising:
   an input part configured to input a user instruction for setting the radio communication terminal to one of a first mode and a second mode;
   a display part configured to display information depending on the user instruction, the display part selectively displaying information at a first display brightness and a second display brightness lower than the first display brightness;
   a setting part configured to set the radio communication terminal to one of the first and second modes in accordance with the input to the input part, and output a mode setting output; and
   a control part configured to control the display part, the control part causing the display part in the first mode to display information at the first display brightness during a first time period and at the second display brightness after an elapse of the first time period, and causing the display part in the second mode to display information at the first display brightness during a second time period longer than the first time period and at the second display brightness after an elapse of the second time period,
   wherein the first mode corresponds to a normal mode in which speech is made using said radio communication terminal, and the second mode corresponds to an information reception mode in which data is received via a radio channel, and wherein said control part sets the second time period when the information reception mode corresponding to the second mode is set.

2. A terminal according to claim 1, wherein
   the display part includes a display for displaying information visible at the second display brightness, and an illumination part configured to illuminate the display part with illumination light to display information on the display at the first display brightness, and
   the control part sets the first and second time periods in accordance with the one set mode, and turns the illumination part on for one of the set first and second time periods.

3. A terminal according to claim 1, wherein the control part includes an update part configured to, when a new user input is supplied during one of the first and second time periods, update the one time period.

4. A radio communication terminal comprising:
   an input part configured to input a user instruction for setting the radio communication terminal to one of a first mode and a second mode;
   a display part configured to display information depending on the user instruction, the display part selectively displaying information at a first display brightness and a second display brightness lower than the first display brightness;
   a setting part configured to set the radio communication terminal to one of the first and second modes in accordance with the input to the input part, and output a mode setting output; and
   a control part configured to control the display part, the control part causing the display part in the first mode to display information at the first display brightness during a first time period and at the second display brightness after an elapse of the first time period, and causing the display part in the second mode to display information at the first display brightness during a second time period longer than the first time period and at the second display brightness after an elapse of the second time period,
   wherein the first mode corresponds to a normal mode in which speech is made using said radio communication terminal, and the second mode corresponds to a mail creation mode in which mail is created via said input means, and wherein said control part sets the second time period when an information reception mode corresponding to the mail creation mode is set.

5. A terminal according to claim 4, wherein the control part includes an update part configured to, when a new user input is supplied during one of the first and second time periods, update the one time period.

6. A terminal according to claim 4, wherein the display part includes a display for displaying information visible at the second display brightness, and an illumination part configured to illuminate the display part with illumination light to display information on the display at the first display brightness, and the control part sets the first and second time periods in accordance with the one set mode, and turns the illumination part on for one of the set first and second time periods.

7. A radio communication terminal comprising:
   an input part configured to input a user instruction for setting the radio communication terminal to one of a first mode and a second mode;
   a display part configured to display information depending on the user instruction, the display part selectively displaying information at a first display brightness and a second display brightness lower than the first display brightness;
   a setting part configured to set the radio communication terminal to one of the first and second modes in accordance with the input to the input part, and output a mode setting output; and a control part configured to control the display part, the control part causing the display part in the first mode to display information at the first display brightness during a first time period and at the second display brightness after an elapse of the first time period, and causing the display part in the second mode to display information at the first display brightness during a second time period longer than the first time period and at the second display brightness after an elapse of the second time period, wherein the first mode corresponds to a normal mode in which speech is made using said radio communication terminal, and the second mode corresponds to a mail browsing mode in which mail is browsed via said input means, and wherein said control part sets the second time period when an information reception mode corresponding to the mail browsing mode is set.

8. A terminal according to claim 7, wherein the control part includes an update part configured to, when a new user input is supplied during one of the first and second time periods, update the one time period.

9. A terminal according to claim 7, wherein the display part includes a display for displaying information visible at the second display brightness, and an illumination part configured to illuminate the display part with illumination light to display information on the display at the first display brightness, and the control part sets the first and second time periods in accordance with the one set mode, and turns the illumination part on for one of the set first and second time periods.

10. A method of controlling a display part in a radio communication terminal, the display part operable to display information corresponding to user input and selectively display information at a first display brightness and a second display brightness lower than the first display brightness, the method comprising:

inputting a user instruction for setting the radio communication terminal to one of a first mode and a second mode;

setting the radio communication terminal to one of the first and second modes in accordance with the input, and outputting a mode setting output; and controlling the display part such that the display part in the first mode displays information at the first display brightness during a first time period and at the second display brightness after an elapse of the first time period, and the display part in the second mode displays information at the first display brightness during a second time period longer than the first time period and at the second display brightness after an elapse of the second time periods, wherein the first mode corresponds to a normal mode in which speech is made using said radio communication terminal, and the second mode corresponds to an information reception mode in which data is received via a radio channel, and wherein the setting of the radio communication terminal includes setting the second time period when the information reception mode corresponding to the second mode is set.

11. A method according to claim 10, further comprising an update step of, when a new user input is supplied during the first and second time periods, updating the time periods.

12. A method of controlling a display part in a radio communication terminal, the display part operable to display information corresponding to a user instruction and selectively display information at a first display brightness and a second display brightness lower than the first display brightness, the method comprising:

inputting a user instruction for setting the radio communication terminal to one of a first mode and a second mode;

setting the radio communication terminal to one of the first and second modes in accordance with the input, and outputting a mode setting output; and controlling the display part so that the display part in the first mode displays information at the first display brightness during a first time period and at the second display brightness after an elapse of the first time period, and so that the display part in the second mode displays information at the first display brightness during a second time period longer than the first time period and at the second display brightness after an elapse of the second time period, wherein the first mode corresponds to a normal mode in which speech is made using the radio communication terminal, and the second mode corresponds to one of an information reception mode in which information is received via a radio channel, a mail creation mode in which mail is created, and a mail browsing mode in which mail is browsed.

13. A method according to claim 12, further comprising an update step of, when a new user input is supplied during the first and second time periods, updating the time periods.

14. A method of controlling a terminal having a display section which can display information visible at one of a brightness mode and a darkness mode in response to a key input, comprising:

setting the brightness mode to have a first time period in response to a first key input that selects a speech mode in which speech is made using the radio communication terminal;

setting the brightness mode to have a second time period longer than the first time period in response to a second key input for setting the terminal to have a predetermined function corresponding to an information reception mode in which data is received via a radio channel;

maintaining the brightness mode during the set one of the first and second time periods;

resetting the brightness mode to have the set one time period to continue the brightness mode during the one time period; and switching the brightness mode to the darkness mode after an elapse of the one time period, the first time period and second time period.

15. A method of controlling a terminal having a display section which can display information visible at one of a brightness mode and a darkness mode in response to a key input, comprising:

setting the brightness mode to have a first time period in response to a first key input;

setting the brightness mode to have a second time period longer than the first time period in response to a second key input for setting the terminal to have a predetermined function, wherein the predetermined function corresponds to one of a wireless application protocol mode for displaying data received from the outside of the terminal, and a mail mode for sending or receiving mail from the outside of the terminal;

maintaining the brightness mode during the set one of the first and second time periods;

resetting the brightness mode to have the one time period to continue the brightness mode during the one time period; and switching the brightness mode to the darkness mode after an elapse of the one time period, the first time period and second time period.

16. A radio communication terminal comprising:
an input part configured to input a user instruction for setting the radio communication terminal to one of first and second modes, the second mode including one of a wireless application protocol mode for displaying data received from the outside of the terminal and a mail mode for editing a mail;
a display part configured to display information depending on input of the user instruction, the display part displaying information at selective first brightness and second display brightness lower than the first display brightness;
a setting part configured to set the radio communication terminal to one of the first and second modes in accordance with the input to the input part, and outputting a mode setting output; and
a control part configured to control the display part, the control part causing the display part in the first mode to display information at the first display brightness during a first time period and at the second display brightness after a lapse of the first time period, and causing the display part in the second mode to display information at the first display brightness during a second time period longer than the first time period and at the second display brightness after an elapse of the second time period.

17. A terminal according to claim 16, wherein
the display part includes a display for displaying information visible at the second display brightness, and an illumination part configured to illuminate the display part with illumination light to display information on the display at the first display brightness, and
the control part sets the first and second time periods in accordance with the one set mode, and turns the illumination part on for one of the set first and second time periods.

18. A terminal according to claim 16, wherein the second mode further includes a mail browsing mode in which mail is browsed via the input part.

19. A terminal according to claim 16, wherein the control part includes an update part for, when a new user input is supplied during either one of the first and second time periods, updating the one time period.

20. A terminal according to claim 16, wherein the first mode includes a speech mode in which speech is made using the radio communication terminal.

21. A method of controlling display part in a radio communication terminal having the display part for displaying information corresponding to input of a user instruction, the display part displaying information at selective first brightness and second display brightness lower than the first display brightness, comprising:
inputting a user instruction for setting the radio communication terminal to one of a first mode and a second mode, the second mode including one of a wireless application protocol mode for displaying data received from the outside of the terminal and a mail mode for sending or receiving mail from the outside of the terminal;
setting the radio communication terminal to either one of the first and second modes in accordance with the input, and outputting a mode setting output; and
controlling the display part configured to, the control step including causing the display part in the first mode to display information at the first display brightness during a first time period and at the second display brightness after an elapse of the first time period, and causing the display part in the second mode to display information at the first display brightness during a second time period longer than the first time period and at the second display brightness after an elapse of the second time period.

22. A method according to claim 21, wherein the second mode includes a mail browsing mode in which mail is browsed via the input part.

23. A terminal according to claim 21, wherein the first mode includes a speech mode in which speech is made using the radio communication terminal.

24. A method of controlling a terminal having a display section which can display information visible at one of a brightness mode and a darkness mode in response to a key input, comprising:
setting the brightness mode to have a first time period in response to the key input which sets a speech mode in which speech is made using the radio communication terminal;
setting the brightness mode to have a second time period longer than the first time period in response to a predetermined key input which sets one of a wireless application protocol mode for displaying data received from the outside of the terminal and a mail mode for sending or receiving mail from the outside of the terminal;
maintaining the brightness mode during the one of the first and second time periods, which is previously set;
resetting the brightness mode to have the one time period to continue the brightness mode during the one time period; and
switching the brightness mode to the darkness mode after an elapse of the one time period, the first time period and second time period.

25. A method according to claim 24, wherein the mail mode includes a mail browsing mode in which mail is browsed via the input part.

26. A radio communication terminal comprising:
a key input section configured to input user instruction;
a display section which can display information visible at one of a brightness mode and a darkness mode in response to a key input in the key input section;
a first setting part configured to set the brightness mode to have a first time period in response to the key input which sets a speech mode in which speech is made using the radio communication terminal;
a second setting part configured to set the brightness mode to have a second time period longer than the first time period in response to a predetermined key input which sets one of a wireless application protocol mode for displaying data received from the outside of the terminal and a mail mode for sending or receiving mail from the outside of the terminal;
a maintaining part configured to maintain the brightness mode during the one of the first and second time periods, which is previously set;
a resetting part configured to reset the brightness mode to have the one time period to continue the brightness mode during the one time period; and
a switching part configured to switch the brightness mode to the darkness mode after an elapse of the one time period, the first time period and second time period.

27. A radio communication terminal according to claim 26, wherein the mail mode includes a mail browsing mode in which mail is browsed via the input part.

* * * * *